United States Patent
Best et al.

[11] Patent Number: 5,976,596
[45] Date of Patent: Nov. 2, 1999

[54] PROCESS FOR OBTAINING EXTRUDED FOOD PRODUCTS HAVING HIGH DIE SHAPE CONFORMITY AND REDUCED ADHESION

[75] Inventors: Eric Best, Dublin, Ohio; Gilles Fayard, Epalinges; Katrin Holz, Pully, both of Switzerland; Pascal Vanacker, St. Joseph, Mo.

[73] Assignee: Nestec S.A., Vevey, Switzerland

[21] Appl. No.: 08/985,030

[22] Filed: Dec. 4, 1997

[51] Int. Cl.⁶ .............................. A23B 4/03; A23B 4/044
[52] U.S. Cl. ...................... 426/448; 426/449; 426/450; 426/516; 426/518; 426/625; 426/654
[58] Field of Search ...................... 426/625, 559, 426/449, 450, 516, 518, 448, 654; 425/208; 99/348; 366/85

[56] References Cited

U.S. PATENT DOCUMENTS

| | | | |
|---|---|---|---|
| 4,031,267 | 6/1977 | Berry et al. | 426/656 |
| 4,418,086 | 11/1983 | Marino et al. | 426/602 |
| 4,517,204 | 5/1985 | Mottur et al. | 426/94 |
| 4,568,550 | 2/1986 | Fulger et al. | 426/19 |
| 4,759,942 | 7/1988 | Von Fulger | 426/621 |
| 4,859,484 | 8/1989 | Bielskis et al. | 426/573 |
| 4,985,269 | 1/1991 | Irvin et al. | 426/560 |
| 5,147,675 | 9/1992 | Gage et al. | 426/549 |
| 5,151,283 | 9/1992 | Foehse et al. | 426/93 |
| 5,260,078 | 11/1993 | Spicer | 426/94 |
| 5,340,598 | 8/1994 | Hay, Jr. et al. | 426/496 |
| 5,622,744 | 4/1997 | Matson et al. | 426/623 |
| 5,694,833 | 12/1997 | Wenger | 99/348 |

FOREIGN PATENT DOCUMENTS 0272502  6/1988  European Pat. Off. .

*Primary Examiner*—Nina Bhat
*Attorney, Agent, or Firm*—Vogt & O'Donnell, LLP

[57] ABSTRACT

For preparing an extrusion-cooked food product, a food component emulsifier is combined with water to obtain an aqueous dispersion of the emulsifier, and the dispersion is fed into an extruder for being mixed with food components being mixed and heated in the extruder to prepare the extrusion-cooked product.

16 Claims, No Drawings

PROCESS FOR OBTAINING EXTRUDED FOOD PRODUCTS HAVING HIGH DIE SHAPE CONFORMITY AND REDUCED ADHESION

FIELD OF THE INVENTION

The present invention relates to preparation of a food product for human or animal consumption made by extrusion-cooking and to use of emulsifiers for preparing the product.

BACKGROUND OF THE INVENTION

It is already known to prepare expanded, shaped products by extrusion-cooking which is a short-time, high-solids process in which components are mixed, sheared and subjected to elevated temperatures and pressures, to produce products having a plastic consistency which are shaped by passage through a forming die, whilst in the plastic phase, and then, cut to length. Expansion of size occurs, owing to the release of the pressure upon die exit and normally, to release of gas(es) such as steam. With the prior art, such a procedure results in non-homogeneity of the expansion both within each individual product portion and from one product portion to another product portion. Expanded extrusion-cooked product pieces therefore are known to suffer limitations in their sharpness of features, in their presence of deformities of shape, in their variability of surface characteristics and in their tendency to clump and stick together.

The positions, size and surface activity of minute internal surfaces within the mass of extrusion-cooked products determine which sites are those upon which the gas generation is nucleated. The degree of subsequent expansion, to generate hollows, is variable and dependent upon the strengths of the layers of surrounding plastic mass, which entrap the gas until rupture occurs and the gas escapes from the structure. The problem is that such a procedure results in pieces of an uneven geometry. With uneven geometry, the cosmetic appearance of the shape and its packing fraction are influenced. In addition, an uneven geometry results in products having some thin parts which more easily break and thereby make a considerable contribution to undesirable dust in subsequent handling operations.

Variable pore size and variable wall thickness also influence the rates of hardening of the different parts of the external surfaces of the cut products. This results in a degree of stickiness on parts of the surfaces which causes some cut products to adhere to each other after cutting, which may be permanent or semi-permanent. In the case of permanent adherence, the products are of reject quality. In the case of semi-permanent adherence, the product portions harden at slower rates at the temporary point of attachment, and usually suffer deformity upon detachment.

Variable hardening rates on the surfaces of the product portions also influence the porosity of such surfaces. This porosity variability influences the visual appeal and color of the product, as well as its water absorption or solubility parameters.

With such characteristics, it is necessary to use relatively high energy to prepare such products and suffer low throughput rates. This causes a high degree of wear and tear on the equipment.

Prior art has considered reducing variability in the expansion characteristic by the addition of fat to the product formulation. Although such an approach significantly reduces the total expansion that occurs, it increases fragility, increases energy requirements, reduces production throughput and has dietary implications. Similarly, dry emulsifiers have been added as part of the feedstock to the cooker extruder, but in this form, they fail to significantly influence the degree of non-uniformity in expansion characteristic. U.S. Pat. No. 5,260,078 concerns such a process and furthermore, in this patent, at the extrusion exit, the product is furthermore coated with a vegetable oil and a second surfactant dispersed in the to obtain a desirable level of flavoring.

SUMMARY OF THE INVENTION

The present invention is based upon the discovery that when emulsifiers, alone or in combination, are added as a finely divided aqueous dispersion to other components for preparing an extrusion-cooked food in a cooker-extruder in an extrusion-cooking process, the expansion characteristics and porosity of the product are normalized. This results in products which have good conformity to die shape and more uniform outer surface characteristics and which have much less sticking together as multiples at the discharge from the die. The process by which such products are prepared also has benefits in terms of reduced energy, higher throughput and less wear and tear on the equipment.

Accordingly, the present invention provides an expanded extrusion-cooked food product for human or animal consumption which comprises between 0.05 and 2.0% and preferably between 0.1 and 1.0% of an emulsifying agent (emulsifier) or a mixture thereof and which has a density of from 100 to 1200 g/l (percentages being set forth herein by weight based upon final food product weight). It is in pieces of uniform geometric shape, which are substantially free from variability in surface features and which are free of multiple pieces joined together. Sectioning of such a product will reveal uniformity in terms of internal porosity and cell wall thickness.

The invention further provides a process for obtaining the expanded extrusion-cooked product, wherein an aqueous dispersion of an emulsifier is prepared and mixed in a cooker-extruder with the other components of a product formulation to prepare the product, the mixture being extruded through a die, cut and subsequently adjusted to a water content of from 2 to 10%.

In accordance with the present invention, the process provides a product which contains finely divided emulsifier particles, which have been pre-dispersed in aqueous media, and are therefore oriented and driven to stabilize a multiplicity of interfaces.

The presence of finely divided emulsifier, evenly distributed through the product, allows a normalization of surface activity to be accomplished. This results in a relatively uniform and widely distributed set of nucleation sites for simultaneous gaseous generation. Expansion of the particle is therefore uniform and in much closer conformity to cross-sectional shape of the die orifice than in products without such presence. Such uniformity of expansion does not interfere with the generation of three-dimensional design, as effected by the enhanced volume extruded through those parts of the die which have a wider orifice dimension and hence, less wall drag.

The emulsifier added in this manner, gives product pieces, which have aesthetic visual appeal, in that their shapes are substantially similar to each other and to the chosen die shape. Considering the surface characteristic, the uniformity of the porosity reduces variability in the functionality of subsequent adsorption phenomena such as occur in the addition of other substances. Uniformity of cell wall thickness permits uniformity of hardening rate thus reducing the tendency for patchy flow deformation, uneven stickiness time, and flecked colors. Control of shape prevents the occurrence of abnormally thin parts to the product pieces which can generate breakage.

DETAILED DESCRIPTION OF THE INVENTION

The type of product according to the invention includes:

Pieces for reconstitution (for example pastas, flakes, pellets, drink granules, baits and fish foods.) Here, the uniformity of size, shape and porosity avoids variability in liquid uptake, prevents the presence of hard pieces, or undesirable portions which may persistently float or aggressively sink and, negates the incidence of uneven expansion which leads to cracking and crumbling.

Flavored particles (for example breakfast cereal, animal foods, snacks) wherein the uniformity of uptake of milk, gravy, flavoring oils, chocolate coating, or saliva in the mouth prevents undesirable variation in texture, taste, composition, or in the adhesion efficiency of subsequently applied dustings.

Dry packaged goods (for example candies, hops, sticks, cookies, flatbreads, biscuits) wherein the uniformity of shape reduces breakage, gives eye appeal and gives uniformity of bulk volume, thereby avoiding excess ullage or head-space in packaging. The even porosity prevents variability in keeping quality, and the even moisture absorption rate prevents warping.

Emulsifiers are substances which reduce surface tension and preferentially reside at surfaces between media phases. The specific properties of emulsifiers are due to their molecular structure. They are substances which are only partially soluble in water. One end of an emulsifier has an affinity for water (hydrophilic) whereas the other end has an affinity for lipids (lipophilic). The hydrophilic/lipophilic properties of emulsifiers are expressed as a hydrophilic/lipophilic balance index, or HLB value. Emulsifiers form complexes with biological materials such as foods. In particular, complexes can be made with the amylose portions of starches, and in the case of ionic emulsifiers, with protein fractions.

The types of emulsifiers according to this invention include:

Phosphated lipids, by example, the lecithin family. These contain a wide range of polar entities including phosphatidylcholine, phosphatidylethanolamine, phosphatidylinositol, phosphatidic acid and various other phospholipids and glycolipids. In addition, they contain a range of saturated fatty acids, including palmitic and stearic acids, and also a range of unsaturated fatty acids, such as linoleic, oleic and linolenic.

Anionic, high HLB emulsifiers, by example, salts of stearoyl-2-mono-actylates, di-lactylates, tri-lactylates and polylactylates. These form lamellar mesophases, bind to hydrophilic patches on proteins and complex with starches. They encourage unfolding at gas surfaces and promote gas subdivision and incorporation.

Anionic, low HLB emulsifiers, by example, diacetyl tartaric acid ester monoglycerides, di-(diacetyl tartaric acid) of monoglycerides, diacetyl tartaric acid esters of diglycerides, monoacetyl mono (diacetyl tartaric acid) esters of monoglycerides, etc. These interact with starch and promote protein aggregation by neutralizing positive charges, which enhances gas retention, dough tolerance and gluten strengthening.

Nonionic emulsifiers such as partial fatty acid esters of sorbitol condensed with ethylene oxide. These strengthen doughs by having polyethylene chains which enter the water phase and give hydrogen bonding to starches or pentosans without suffering salt sensitivity.

Nucleation for gas generation preferentially occurs at discontinuities in the surfaces between phases. The presence of finely divided and evenly distributed surface active emulsifiers promotes the occurrence of such sites, whereas products which undergo gas nucleation at, or immediately after, a die or other shaping device experience bubble expansion around the nucleation site.

The rate of expansion is determined in part by the total number and distribution of such nucleation sites and also by the surface tension forces of the matrix as influenced by the interactions between the emulsifier and components of the base material. Insufficient, inactive or poorly distributed nucleation sites result in uneven gas bubble volumes and uneven bubble wall thicknesses.

Reactivity between the emulsifier and the wall material of the bubble changes the elasticity resistance forces and the value at which the bubble wall bursts. Even distribution of finely divided emulsifiers reduces the latent variability in such bubble wall properties. Even expansion rate of bubbles occurs and is followed by the generation of rupture holes in the bubble walls when bubbles have reached equivalent volume (caused equivalent stress).

The reduction in potentially uneven bubble position, number and size influences several factors. The expansion rate and volume becomes even across the whole product piece. This provides an expanded article which has substantially the same shape as that intended by die design. It reduces the percentage and degree of deformed pieces produced in a production run. It makes the packing fraction more consistent. The aesthetic cosmetic of the product is enhanced both in terms of shape and uniformity of color. In addition, the occurrence of thin patches on the surface or of thin legs or flanges in the shape is minimized, which reduces the tendency for breakage at weaker points.

Further, the tendency for softer, slower setting patches caused by portions of thicker walls is reduced. This minimizes the creation of bulbous deformities. It also minimizes prolonged adhesiveness at certain spots which leads to the creation of multiples, as product pieces start to stick together. The minimization of stuck-together pieces prevents the occurrence of surface damaged products, where such pieces have subsequently come apart, but left wounds from the encounter.

Additionally, uniformity in porosity of both product surface and product interior gives reduced variation in physical properties including adsorption characteristics and strength.

Standard base formulations for preparing extrusion-cooked products are used, according to published data and processes. The product components mixed are those already mentioned in relation with the product. However, some of the moisture in the formulation is used to create an independently prepared, finely divided, aqueous dispersion of an emulsifier or of more than one emulsifier in combination. This dispersion is metered into the mixing chambers of the cooker extruder.

The emulsifier is added as an aqueous dispersion with a total emulsifier percentage of between 0.5 and 25%, preferably between 1 and 15%. The metering of the dispersion is adjusted to achieve a final concentration in the cooker-extruder product of between 0.05 and 2.0% based upon a dry weight basis. The low percentage at which the effects are achieved is the result of the form in which the emulsifier is added. The specific structural and other functionality aspects achieved depends directly upon the nature and source of the particular chosen emulsifier.

The heating in the cooker-extruder takes place at a temperature comprised between 120 and 180° C. The duration of the heating is comprised between 20 seconds and 3 minutes. The cooker-extruder used can be of single-screw or twin-screw design.

The effect of adding the finely divided aqueous emulsifier dispersion is to generate, within the mass, a uniform, even distribution of a multitude of minute internal surfaces of modified interfacial tension. Upon release from the die, these sites act as nuclei for subsequent gas generation, thus normalizing an otherwise random event.

Prior to the die, the mass is plastic and under cooker-extruder pressure conditions, and the extra interfacial tension modifies the structural deformation characteristics of the mass. This leads to large changes in the Theological properties of the extrudate within the barrel, according to the emulsifier and concentration chosen.

The resultant changes in the work input permits beneficial modifications to be made to the residence time, which enables enhanced feed rate and throughput. In addition, wear and tear on the cooker-extruder equipment (barrel linings, screw elements) can be reduced thus giving a longer life to the equipment. This is a general result of energy savings.

EXAMPLES

The following further illustrates the invention. All percentages are given in weight (dry basis) unless otherwise specified, and results are expressed in comparison to reference or control products in which the invention or in which an emulsifier was not used, all other parameters being kept identical.

Emulsifier content is measured according to published methods.

Density refers to bulk density, which is the mass of a collection of pieces per unit volume. It was measured by weighing the mass of pieces contained in a litre plastic cylinder.

Sensorial Data

Samples were confirmed to be significantly different by the application of standard duo-trio testing. This was done against a series of reference samples made at various time intervals intermittent with the preparation of test samples.

The test samples, which proved statistically different from all reference samples, were considered in subsequent profiling tests. Results obtained were subjected to Newman and Keul's analysis of variance test using alpha<=005. The data was retested using F ratios and the variability of each judge was allowed for by Procrusteenne analysis. Results as reported in the examples are statistically significant unless otherwise stated.

"Porosity" is a measure of the number of holes in the product's surface. A large number is given by a lot of small holes indicating controlled gas nucleation and a uniform expansion. A small number of large holes indicates uncontrolled nucleation, random expansion and gas release which leads to shape distortion.

"Homogeneity of color" is a measure of the uniformity of the color. Controlled gas generation, expansion and release enhances the homogeneity of the color. A larger number indicates greater homogeneity.

"Conformity to die design" is a measure of the shape definition. A high value indicates a low level of distortion has occurred during product expansion.

"Deformed products" is a measure of the number of products which fail to resemble the die shape geometry.

"Crumpled products" is a measure of the number of products having the appearance of crushed or squashed aspects to their surfaces.

"Thin points" is a measure of the parts of the products which fail to have the volume.

"Energy to break" is a physical test conducted by Instron, which determines the force in Newtons to crush a standard weight of product placed in a Kramer shear press.

"Extruder power" is the net power of the motor used to drive the extrusion process. Specific mechanical energy has the same meaning per kg of product in the extruder. Extruder power reduced means that less energy is used with emulsifier than without, for reaching the same product output.

"Throughput" is the number of pieces of the same thickness per unit time.

"Multiple products" is a measure of the proportion of products produced which are stuck together.

Example 1

| Base | % |
| --- | --- |
| Wholecorn | 50[%] |
| Animal Protein | 30 |
| Corn Gluten (60% Protein) | 12 |
| Soy Bean (44% Protein) | 6 |
| Sodium Chloride | 2 |
| Total | 100 |

The base was prepared as a dry mix.

Emulsifier Dispersion

In this Example, the emulsifier was a 50/50 mixture of sodium stearoyl-2-lactylate and diacetyl tartaric acid ester monoglyceride added at 0.1% of the final product.

The emulsion was prepared by adding the required quantity of emulsifier to water at 60° C. A fine dispersion was achieved by mixing with a POLYTRON dispersator for 2 minutes.

Mixing was maintained in a pump tank.

Sample Preparation

The base was fed at a rate of 16.5 kg/h into a Clextral BC21 twin-screw extruder (L/D 20) equipped with 5 temperature zones and operated at 450 rpm. Emulsion dispersion was added at an appropriate rate into the second zone of the equipment. A die was used and pieces were produced by using a rotary-bladed cutter mounted at the face of the die. The cutter speed was adapted to produce pieces of the same thickness. Reference cutter speed was 15,000 pieces/kg. Extruded pieces were dried to 6% moisture by heating at 120° C. for 8 minutes.

Porosity was increased by 45.2%

Homogeneity of color was increased by 25.5%

Conformity to die design was increased by 23.1%

Deformed products were reduced by 23.5%

Crumpled products were reduced by 27.8%

Extruder power was reduced by 15.6%

Example 2

This was prepared as Example 1 except that the emulsifier was added at 0.4% of the final product.

Homogeneity of color was increased by 37%

Conformity to die design was increased by 38%

Deformed products were reduced by 30.2%
Crumpled products were reduced by 33.5%
Thin points were reduced by 30.1%
Extruder power was reduced by 43.9%

Example 3

This was prepared as Example 2 except that the emulsifier was sodium stearoyl-2-lactylate (0.4% of the final product).

Porosity was increased by 28.1%
Homogeneity of color was increased by 47.1%
Conformity to die design was increased by 46.6%
Deformed products were reduced by 46.9%
Crumpled products were reduced by 48.3%
Thin points were reduced by 45.0%
Extruder power was reduced by 32.9%

Example 4

This was prepared as Example 3 except that the emulsifier was lecithin (0.4% of the final product).

Porosity was increased by 25.3%
Homogeneity of color was increased by 47.5%
Conformity to die design was increased by 26.5%
Crumpled products were reduced by 21.3%
Extruder power was reduced by 34.5%

Example 5

This was prepared as Example 4 except that the emulsifier was polyoxyethylene sorbitan trioleate (0.4% of the final product).

Porosity was increased by 18.2%
Homogeneity of color was increased by 61.4%
Conformity to die design was increased by 33.2%
Deformed products were reduced by 23.4%
Crumpled products were reduced by 12.7%
Extruder power was reduced by 41.3%

Example 6

This was prepared as Example 5 except that the emulsifier was diacetyl tartaric acid ester monoglyceride (0.4% of the final product).

Homogeneity of color was increased by 60.5%
Conformity to die design was increased by 41.6%
Deformed products were reduced by 63.0%
Crumpled products were reduced by 30.9%
Extruder power was reduced by 39.8%

Example 7

This Example compares products in which emulsifier addition or fat addition (to prior art) has been made to achieve the same cosmetic benefits. The data is expressed as percent changes versus a control sample (poorer cosmetic) without additions.

| % | Density % | Energy to Break % | Extruder Power % | Throughput % |
| --- | --- | --- | --- | --- |
| 2.5 tallow | +15.0 | −26.0 | +16.6 | −28.1 |
| 0.1 SS2L | −4.2* | −0.6* | −20.4 | −1.3* |

| % | Density % | Energy to Break % | Extruder Power % | Throughput % |
| --- | --- | --- | --- | --- |
| 0.1 Datem | −1.8* | −0.6* | −25.3 | −1.3* |
| 0.1 Tween | −3.7* | −1.1* | −25.1 | −1.3* |
| 0.1 Lecithin | −2.5* | +0.1* | −17.8 | −0.4* |
| 0.1 SS2L/Datem | 6.2 | −0.8* | −25.6 | +19.6 |

*=Not significant
SS2L=Sodium stearoyl-2-lactylate
Datem=Diacetyl tartaric acid ester monoglyceride
Tween=Polyoxyethylene sorbitan tiroleate
Lecithin=Soya lecithin
SS2L/Dat=A 50/50 mixture by weight.

This Example shows that the addition of the finely divided aqueous dispersion of emulsifier permits the gaining of the cosmetic benefits without adverse effects on density, fragility or throughput (as are given by the fat addition). Also, the addition of the finely divided aqueous dispersion of emulsifier permits benefits in extrusion power not achieved by the fat addition.

Example 8

This Example illustrates reductions in the incidence of reject multiple products, caused by extruded pieces sticking together at the egress of the die.

A single-screw, Wenger X25 cooker-extruder was used at 350 rpm. The emulsifier was lecithin injected into the first part of the extruder. The data is expressed as percent changes versus a control sample without additions.

| Emulsifier Level in final Product | Incidence of Multiple Products |
| --- | --- |
| 0.2% | −11% |
| 0.4% | −60% |
| 0.9% | −98% |

Example 9

In this Example, a twin screw, Clextral BC 72 cooker extruder was used at 300 rpm. The emulsifier was injected at the end of the feed section. The data is expressed as percent change versus a control sample without additions.

| Emulsifier Level in final Product | Incidence of Multiple Products |
| --- | --- |
| 0.1% | −47% |
| 0.2% | −58% |
| 0.3% | −78% |
| 0.4% | −95% |
| 0.5% | −99% |
| 0.6% | −99% |

We claim:

1. In a process for preparing an extrusion-cooked food product wherein food components for preparing the food product are fed into an extruder and the food product preparation components are mixed in the extruder and heated in the extruder for cooking the components while the components are passed through the extruder and wherein the mixed, cooked components are extruded via a die for obtaining the extrusion-cooked food product and the food product obtained via the die is cut into pieces and dehydrated to water content of from 2% to 10% by weight, the improvements comprising:

combining a food component emulsifier with water to obtain an aqueous dispersion of the emulsifier and feeding the aqueous dispersion into the extruder for mixing with the food product preparation components in the extruder for preparing and obtaining the extrusion-cooked food product.

2. A process according to claim 1 wherein the aqueous dispersion comprises the emulsifier in an amount, by weight, of between 0.5% and 25%.

3. A process according to claim 2 wherein the emulsifier amount is between 1% and 15%.

4. A process according to claim 2 or 3 wherein the aqueous dispersion is fed to the extruder in an amount and mixed with an amount of the food product preparation components so that, by weight based upon dry weight, the extrusion-cooked food product comprises the emulsifier in an amount of between 0.05% and 2.0%.

5. A process according to claim 2 or 3 wherein the aqueous dispersion is fed to the extruder in an amount and mixed with an amount of the food product preparation components so that, by weight based upon dry weight, the extrusion-cooked food product comprises the emulsifier in an amount of between 0.1% and 1.0%.

6. A process according to claim 1 wherein the aqueous dispersion contains the emulsifier in an amount and is fed to the extruder in an amount so that, by weight based upon dry weight, the extrusion-cooked food product comprises the emulsifier in an amount of between 0.05% and 2.0%.

7. A process according to claims 6 wherein the emulsifier amount is between 0.1% and 1.0%.

8. A process according to claim 1 wherein the aqueous dispersion emulsifier comprises an emulsifier selected from the group consisting of phospholipids and glycolipids.

9. A process according to claim 1 wherein the aqueous dispersion emulsifier comprises an emulsifier selected from the group consisting of lecithin, phosphatidylcholine, phosphatidylethanolamine and phosphatidylinositol.

10. A process according to claim 1 wherein the aqueous dispersion emulsifier comprises an anionic hydrophilic/lipophilic emulsifier.

11. A process according to claim 1 wherein the aqueous dispersion emulsifier comprises an emulsifier selected from the group consisting of diacetyl tartaric acid ester monoglycerides, di-(diacetyl tartaric acid) of monoglycerides, diacetyl tartaric acid esters of diglycerides and monoacetyl mono (diacetyl tartaric acid) esters of monoglycerides and of salts of stearoyl-2-monolactylates, di-lactylates, tri-lactylates, polylactylates.

12. A process according to claim 1 wherein the aqueous dispersion emulsifier comprises a partial fatty acid ester of sorbital condensed with ethylene oxide.

13. A process according to claim 1 wherein the aqueous dispersion emulsifier comprises an emulsifier selected from the group consisting of monoglycerides, diglycerides, acetoglycerides, lactic acid esters, succinic acid esters, diacetyl tartaric acid esters, citric acid esters, sucroglycerides, polyglycerol esters of fatty acids, propylene glycol esters of fatty acids, sugar esters of fatty acids, sorbitan esters of fatty acids, polyoxyethylene sorbitan esters, stearoyl lactylates and saponified triglycerides.

14. A process according to claim 1 wherein the food product components are heated for cooking in the extruder at a temperature of between 120° C. to 180° C.

15. A process according to claim 1 or 14 wherein the food product components are mixed and passed through the extruder for a period of from 20 seconds to 3 minutes.

16. A process according to claim 1 wherein the extruder is selected from the group consisting of a single-screw extruder and a double-screw extruder.

* * * * *

UNITED STATES PATENT AND TRADEMARK OFFICE
CERTIFICATE OF CORRECTION

PATENT NO. : 5, 976, 596
DATED : November 2, 1999
INVENTOR(S) : Eric BEST, et al.

It is certified that error appears in the above-identified patent and that said Letters Patent is hereby corrected as shown below:

Column 9, line 1, after "to", insert -- a --.

Signed and Sealed this

Thirteenth Day of June, 2000

Attest:

Q. TODD DICKINSON

*Attesting Officer*       *Director of Patents and Trademarks*